United States Patent
Moon et al.

(10) Patent No.: US 8,094,473 B2
(45) Date of Patent: Jan. 10, 2012

(54) BRIDGELESS POWER FACTOR CORRECTION CIRCUIT

(75) Inventors: Gun Woo Moon, Daejeon (KR); Dong Wook Lee, Gyunggi-do (KR); Kyu Min Cho, Daegu (KR); Seong Wook Choi, Daejeon (KR); Don Sik Kim, Gyunggi-do (KR); Jong Pil Kim, Gyunggi-do (KR); Sang Cheol Bong, Gyunggi-do (KR); Dong Joong Kim, Gyunggi-do (KR); Tae Won Heo, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 609 days.

(21) Appl. No.: 12/188,707

(22) Filed: Aug. 8, 2008

(65) Prior Publication Data

US 2009/0168476 A1 Jul. 2, 2009

(30) Foreign Application Priority Data

Dec. 28, 2007 (KR) .................... 10-2007-0140713

(51) Int. Cl.
*H02M 7/04* (2006.01)
(52) U.S. Cl. ............................................ 363/89; 363/70
(58) Field of Classification Search .................. 323/205, 323/207, 222, 224, 282–288; 363/16–20, 363/21.12, 34, 61, 71, 89; 315/291, 307, 315/224, 247

See application file for complete search history.

(56) References Cited

U.S. PATENT DOCUMENTS

| 5,109,185 A | * | 4/1992 | Ball | ............................... 323/207 |
| 2006/0198172 A1 | | 9/2006 | Wood | |
| 2007/0247122 A1 | | 10/2007 | Huang | |

FOREIGN PATENT DOCUMENTS

KR 1020060023221 A 3/2006

OTHER PUBLICATIONS

Applicant prior figure 2A.*

* cited by examiner

*Primary Examiner* — Rajnikant Patel
(74) *Attorney, Agent, or Firm* — Lowe, Hauptman, Ham & Berner, LLP

(57) ABSTRACT

There is provided a bridgeless power factor correction circuit that corrects a power factor by complementarily switching two switches according to phase of input power without using rectifier bridge diodes. A bridgeless power factor correction circuit according to an aspect of the invention may include: a switching unit having a plurality of switches and alternately switching input AC power; a stabilizing unit rectifying and smoothing the power switched by the switching unit; and a control unit controlling an alternate switching operation between the plurality of switches according to phases of the input power.

13 Claims, 7 Drawing Sheets

BRIDGELESS POWER FACTOR CORRECTION CIRCUIT

CROSS-REFERENCE TO RELATED APPLICATIONS

This application claims the priority of Korean Patent Application No. 2007-0140713 filed on Dec. 28, 2007, in the Korean Intellectual Property Office, the disclosure of which is incorporated herein by reference.

BACKGROUND OF THE INVENTION

1. Field of the Invention

The present invention relates to a bridgeless power factor correction circuit, and more particularly, to a bridgeless power factor correction circuit that corrects a power factor by complementarily switching two switches on and off according to phases of input power without using a rectifier bridge diode.

2. Description of the Related Art

In recent years, as harmonics regulations have been tightened worldwide, the use of power factor correction circuits in electronic products has become common and required.

In general, the power factor correction circuit is divided into a passive power factor correction circuit and an active power factor circuit. The passive power factor correction circuit is configured by appropriately designing a passive line filter composed of an inductor and a capacitor at a power input side so as to attenuate harmonic components of power current. The passive power factor correction circuit has a simple configuration and is manufactured at low cost. However, it is difficult to stabilize a voltage since the size of an output voltage varies according to the size of an input power voltage. Further, since the passive power factor correction circuit needs to be designed according to commercial power frequency, it increases in size and volume significantly.

The active power factor correction circuit is configured by applying a generally known boost converter. The active power factor correction circuit has a power factor almost close to 1 and can output stable direct current power regardless of a variation in input voltage. However, since the active power factor correction circuit uses a switching method, a configuration circuit becomes complex to increase the unit cost, and it becomes difficult to control the circuit.

Therefore, in order to satisfy the harmonic regulations that have been tightened worldwide, most of the high power products are using active power factor correction circuits.

FIG. 1 is a circuit diagram illustrating a general active power factor correction circuit.

As shown in FIG. 1, an active power factor correction circuit using a general boost converter uses bridge diodes BD at an input terminal. The bridge diodes BD cause high conduction loss of approximately 2 to 3% of all power capacity. Therefore, studies on various types of bridgeless power factor correction circuits have been conducted these days.

FIG. 2A is a circuit diagram illustrating a general active power factor correction circuit. FIG. 2B is a waveform diagram illustrating a main part of the general active power factor correction circuit.

Referring to FIG. 2A, as described above, a general bridgeless power factor correction circuit, which is an improvement on the general active power factor correction circuit, is shown.

The above-described general bridgeless power factor correction circuit detects a current flowing through boost inductors L1 and L2 through a detection resistor Rsense. That is, the detection resistor Rsense is connected between diodes D1 and D3 and a ground terminal of the circuit to detect the current flowing through the inductors.

Then, a sine wave having the same phase as the input voltage is obtained from the detected current flowing through the inductors by using a correction circuit. At the same time, an output voltage is detected by using resistors R1 and R2, and the sine wave obtained by detecting the current flowing through the inductors is multiplied by appropriate gain according to a value of the detected output voltage.

The signal, formed as described above, is compared with a triangle wave to generate a gate signal for driving a switch. That is, the gate signal of the switch is generated by detecting the current flowing through the inductors and the output voltage. At this time, the gate signal of the above-described switch is used to turn on or off the first and second switches M1 and M2 at the same time.

FIG. 2B is a waveform diagram illustrating a main part of the general bridgeless power factor correction circuit.

Referring to FIGS. 2A and 2B, the difference between forward voltage drop across the diodes D1 and D2 and voltage drop the sensing resistor Rsense and on-resistance of the switches M1 and M2 and backward voltage drop across the diodes D3 and D4 is applied to the first and second inductors L1 and L2.

That is, when the switches M1 and M2 are turned on at the same time, one of the first and second inductors L1 and L2 operates as a boost inductor according to phases of the input voltage. When the switches M1 and M2 are turned on, voltage drop across the switches M1 and M2 becomes smaller than voltage drop across the diodes D1 to D4, so that the drop voltage across the diodes D1 to D4 is applied to the other inductor. Even though a very small voltage obtained by subtracting the voltage drop across the switches M1 and M2 from the voltage drop across the diodes D1 to D4 is applied to the other inductor, since the voltage is applied for a long period of time, that is, a half cycle of the input voltage of approximately 8.3 msec, a considerable amount of current continues to flow through the inductors, which is supposed to operate at very fast switching frequency, during the half cycle of the input voltage.

FIG. 3 is a current waveform diagram illustrating a general bridgeless power factor circuit.

Referring to FIG. 3, it can be seen that the shape of the input current is distorted due to a reverse current of the inductor. This causes a reduction in power factor and generation of high harmonic components.

SUMMARY OF THE INVENTION

An aspect of the present invention provides a bridgeless power factor correction circuit that corrects a power factor by complementarily switching two switches on and off according to phases of input power without using a rectifier bridge diode.

An aspect of the present invention also provides a bridgeless power factor correction circuit including: a switching unit having a plurality of switches and alternately switching input AC power; a stabilizing unit rectifying and smoothing the power switched by the switching unit; and a control unit controlling an alternate switching operation between the plurality of switches according to phases of the input power.

The switching unit may include: first and second inductors receiving different phases of the input power; and first and second switches connected in series with the first and second inductors, respectively, and alternately turned on and off under the control of the control unit.

The switching unit may further include first and second diodes removing common mode noise of the input power.

The control unit may include: a detector detecting phases of the input power; a comparator comparing the phases detected by the detector with a reference phase; and a signal generator multiplying results of the comparison from the comparator by predetermined gate signals and generating first and second switching signals for alternately turning the two switches on and off.

The detector may include: third and fourth diodes detecting phases of the input power; and a plurality of division resistors dividing a voltage of the input power from the third and fourth diodes.

The comparator may include: first and second comparison units comparing the phases detected by the detector with the reference phase based on the ground; and first and second inversion units inverting the comparison results of the first and second comparison units, respectively.

The signal generator may include: a gate signal generator supplying the predetermined gate signals; a first logic device multiplying the gate signal from the gate signal generator by the comparison result from the first inversion unit to generate the first switching signal; and a second logic device multiplying the gate signal from the gate signal generator by the comparison result from the second inversion unit to generate the second switching signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
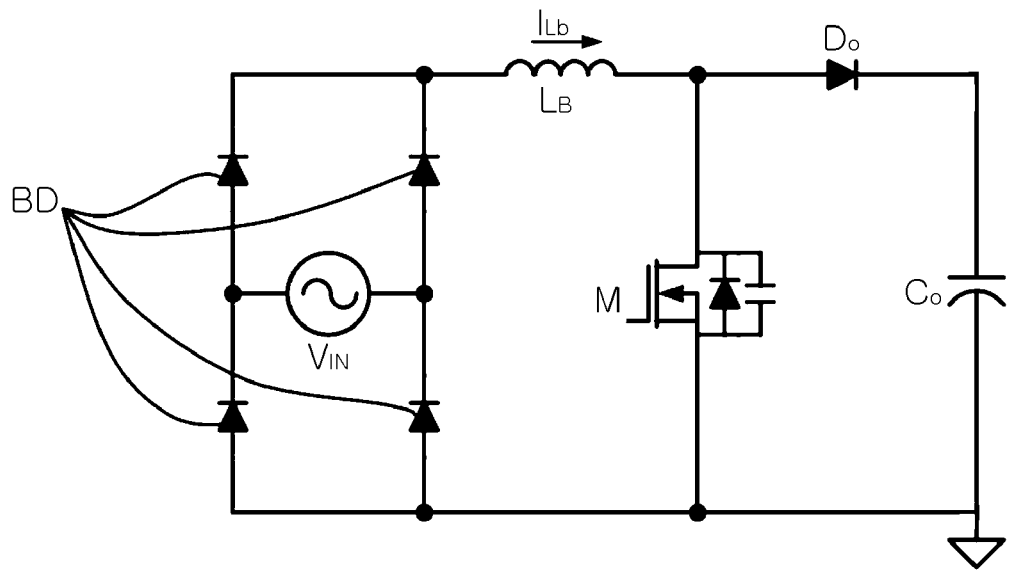
FIG. 1 is a circuit diagram illustrating a general active power factor correction circuit.
Figure 2A:
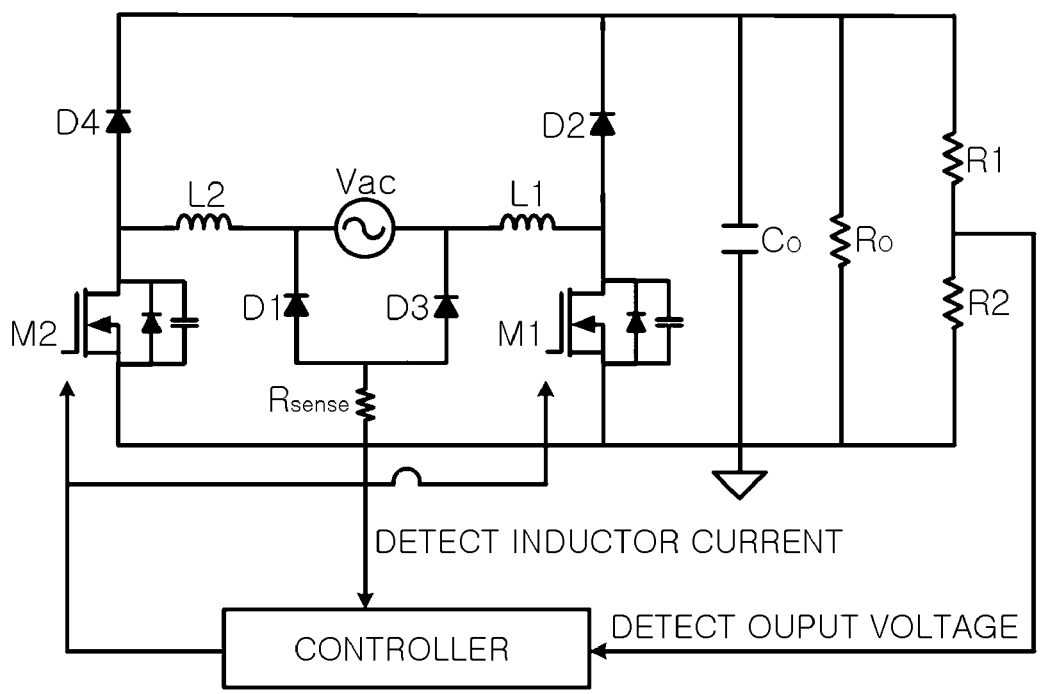
FIG. 2A is a circuit diagram illustrating a general bridgeless power factor correction circuit.
Figure 2B:
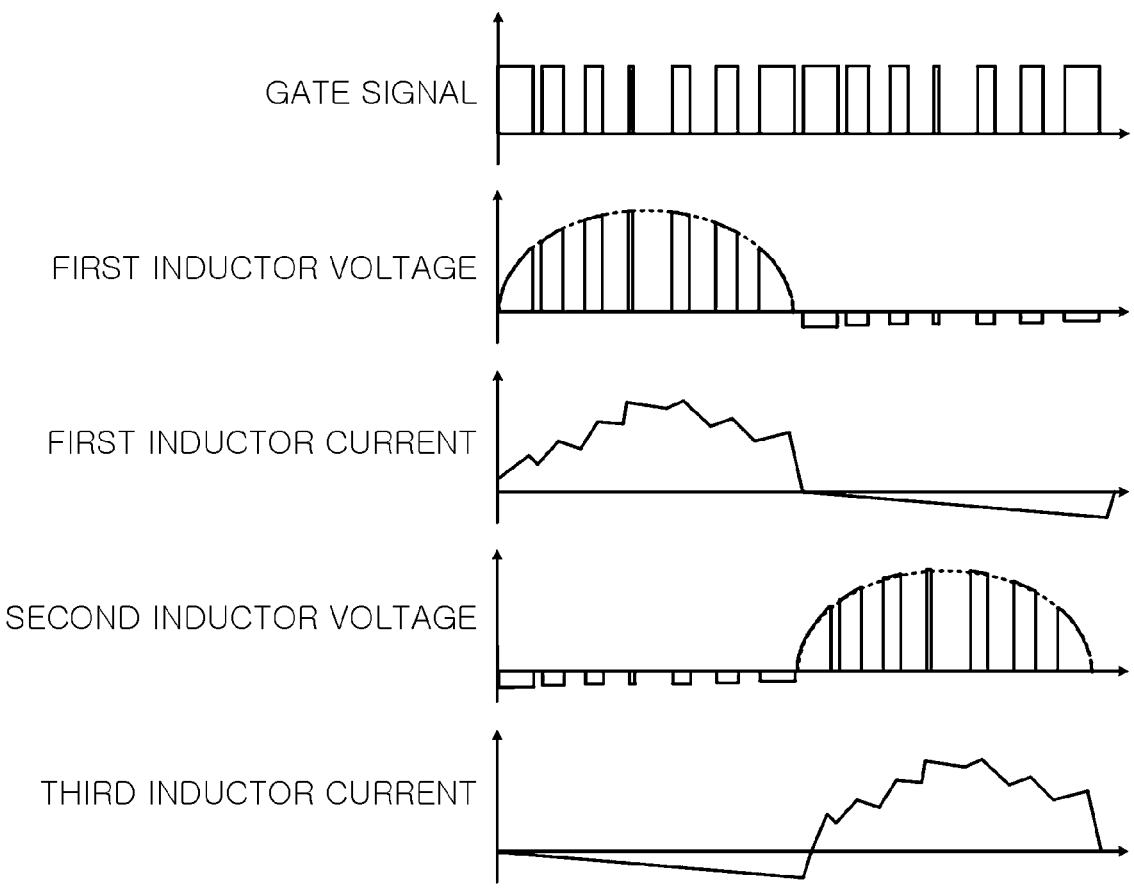
FIG. 2B is a waveform diagram illustrating a main part of the general bridgeless power factor correction circuit.
Figure 3:
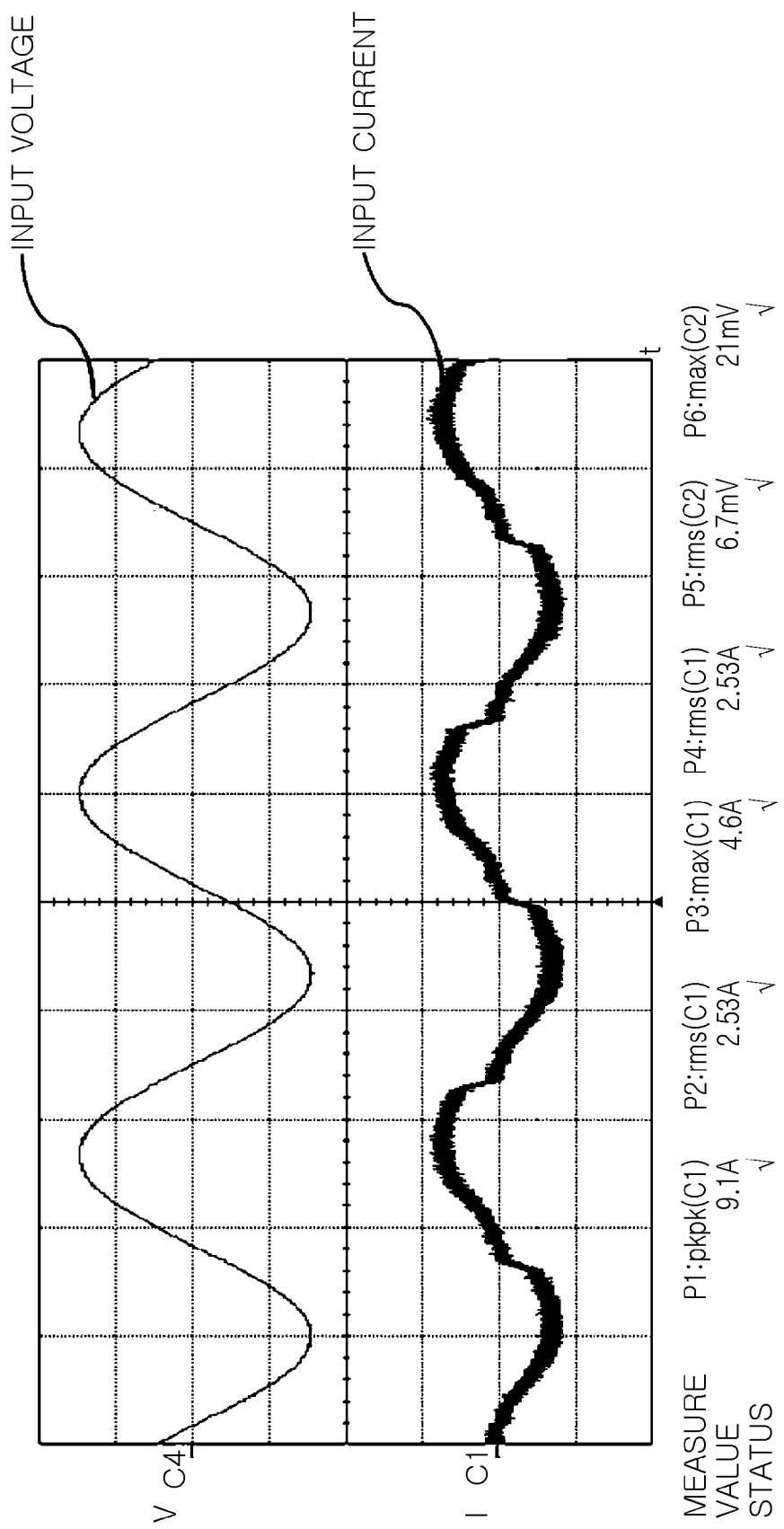
FIG. 3 is a current waveform diagram of the general bridgeless power factor correction circuit.
Figure 4:
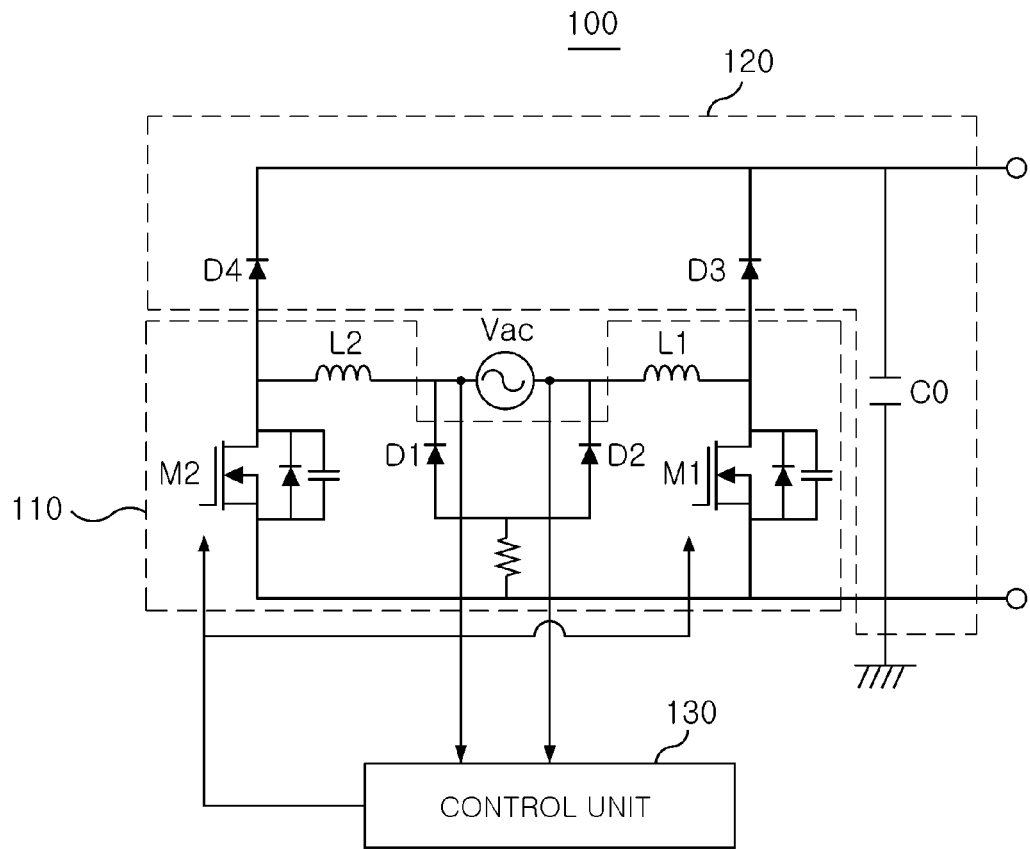
FIG. 4 is a circuit diagram illustrating a bridgeless power factor correction circuit according to an exemplary embodiment of the present invention.

FIG. 4 is a circuit diagram illustrating a bridgeless power factor circuit according to an exemplary embodiment of the present invention.

Referring to FIG. 4, a bridgeless power factor correction circuit 100 according to an exemplary embodiment of the invention includes a switching unit 110, a stabilizing unit 120, and a control unit 130.

The switching unit 110 includes first and second inductors L1 and L2 that are individually connected in series with an input AC power Vac terminal, and first and second switches M1 and M2 that are connected to the first and second inductors L1 and L2, respectively.

The first and second inductors L1 and L2 are used as boost inductors according to a switching operation between the first and second switches M1 and M2. The first and second switches M1 and M2 are alternately turned on and off according to switching control signals.

First and second diodes may be individually connected in series with the input AC power Vac terminal to remove common mode noise of input AC power.

The stabilizing unit 120 rectifies and smoothes the power switched by the switching unit 110 to stabilize the power. The stabilizing unit 120 may include third and fourth diodes D3 and D4 and a capacitor Co.

The control unit 130 supplies first and second switching signals according to phases of the input AC power Vac to control the switching unit 110 so that the first and second switches M1 and M2 of the switching unit 110 are alternately turned on and off.

Figure 5:
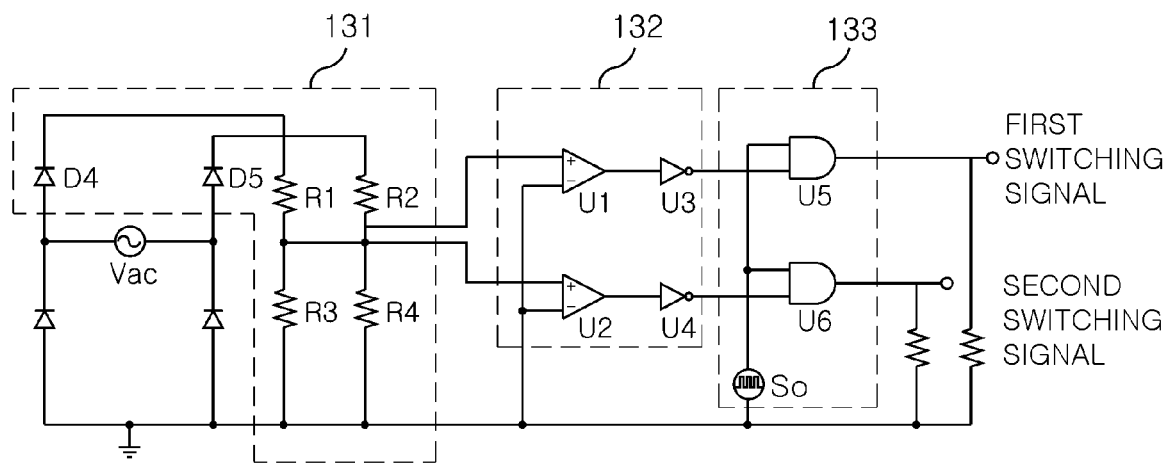
FIG. 5 is a detailed diagram illustrating a configuration of a control unit used in the bridgeless power factor correction circuit according to the exemplary embodiment of the present invention.

FIG. 5 is a detailed view illustrating a control unit used in the bridgeless power factor correction circuit according to the embodiment of the present invention.

Referring to FIG. 5, the control unit 130 may include a detector 131, a comparator 132, and a signal generator 133.

The detector 131 may include fifth and sixth diodes D5 and D6 and a plurality of division resistors R1 to R4. The fifth and sixth diodes D5 and D6 are individually connected in series with the input AC power Vac terminal and detect the phase of the input AC power. Each of the plurality of division resistors R1 to R4 divides a voltage level of the power detected by each of the fifth and sixth diodes D5 and D6.

The comparator 132 compares the phases of the input AC power detected by the detector 131 with a predetermined reference phase and transmits results of the comparison to the signal generator 133. Then, the comparator 132 may include first and second comparison units U1 and U2 and first and second inversion units U3 and U4. The first and second comparison units U1 and U2 compare the detected phases of the input AC power with the reference phase. The first and second inversion units U3 and U4 invert the comparison results from the first and second comparison units U1 and U2, respectively.

The first and second comparison units U1 and U2 compare the detected phases of the input AC power with the reference phase based on the ground.

The signal generator 133 generates the first and second switching signals according to the comparison results from the comparator 132. The signal generator 133 may include first and second logic devices U5 and U6 that multiply predetermined gate signals from a gate signal generator So by the comparison results from the comparator 132 to generate the first and second switching signals, respectively.

Figure 6:
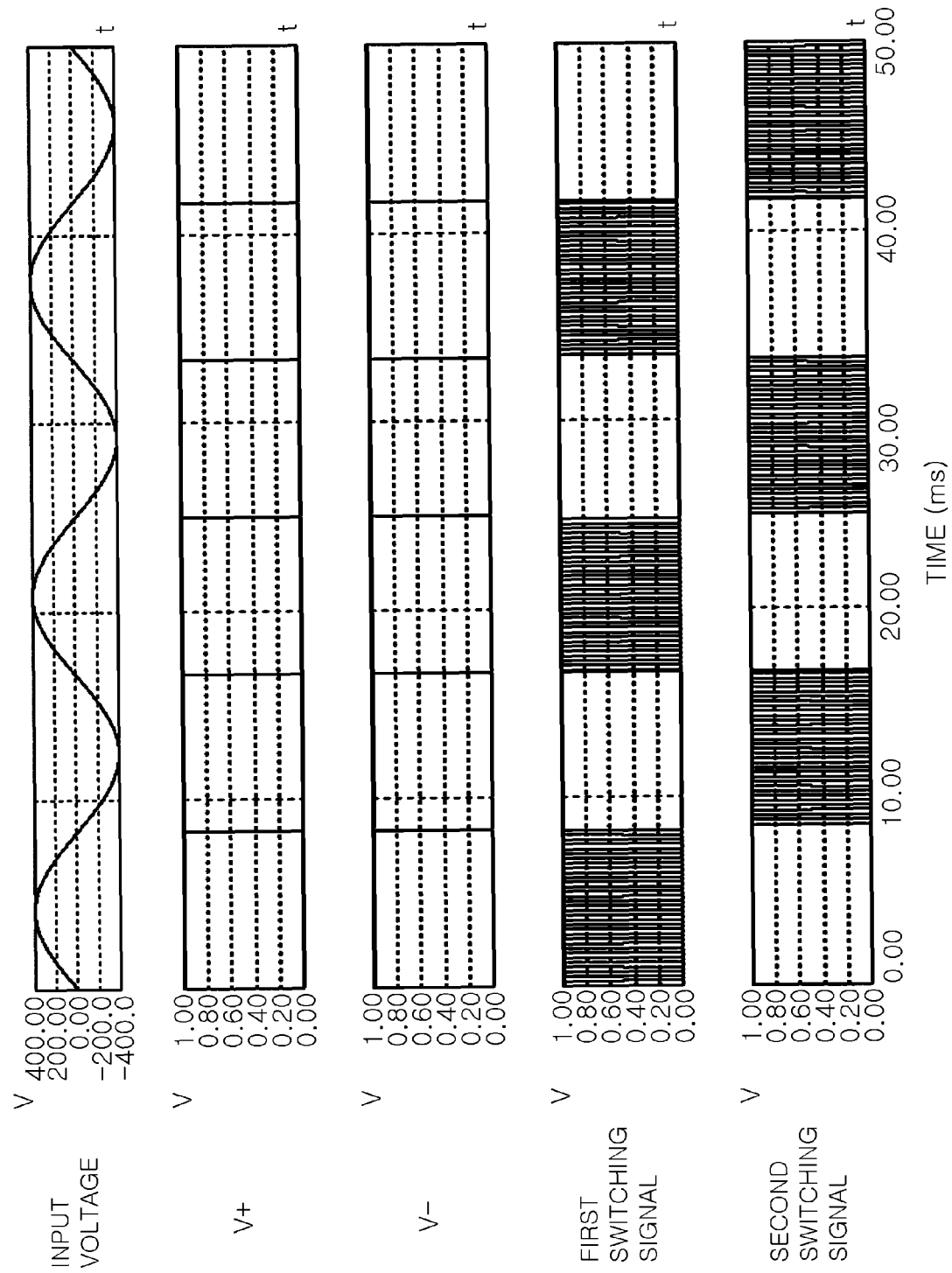
FIG. 6 is a simulation waveform diagram illustrating a main part of the control unit of FIG. 5.

FIG. 6 is a simulation waveform diagram illustrating a main part of the control unit of FIG. 5.

Referring to FIGS. 5 and 6, each of the fifth and sixth diodes D5 and D6 detects the phase of the input AC power. The detected phase is divided by the plurality of division resistors R1 to R4 and input to the first and second comparison units U1 and U2. When the input voltage has a positive (+) phase, the first comparison unit U1 has an output of 1 (V+ in FIG. 6). When the input voltage has a negative (−) phase, the second comparison unit U2 has an output of 1 (V− in FIG. 6). The comparison results are inverted by the first and second inversion units U3 and U4, respectively, and are transmitted to the first and second logic devices U5 and U6, respectively. In order to control the switches formed of MOS-FETs, the first and second logic devices U5 and U6 multiply the predetermined gate signals from the gate signal generator So by the inverted comparison results to supply the first and second switching signals, respectively.

That is, for example, an alternate switching operation is performed during a half cycle of the phase of the input AC power. That is, when the first switching signal is output at a high level, and the second switching signal is output at a low level, the first switch M1 is turned on and the second switch M2 is turned off. Then, an alternating switching operation is performed during a next half cycle of the phase of the input AC power. That is, when the second switching signal is output at a high level, and the first switching signal is output at a low level, the second switch M2 is turned on and the first switch M2 is turned off.

Figure 7:
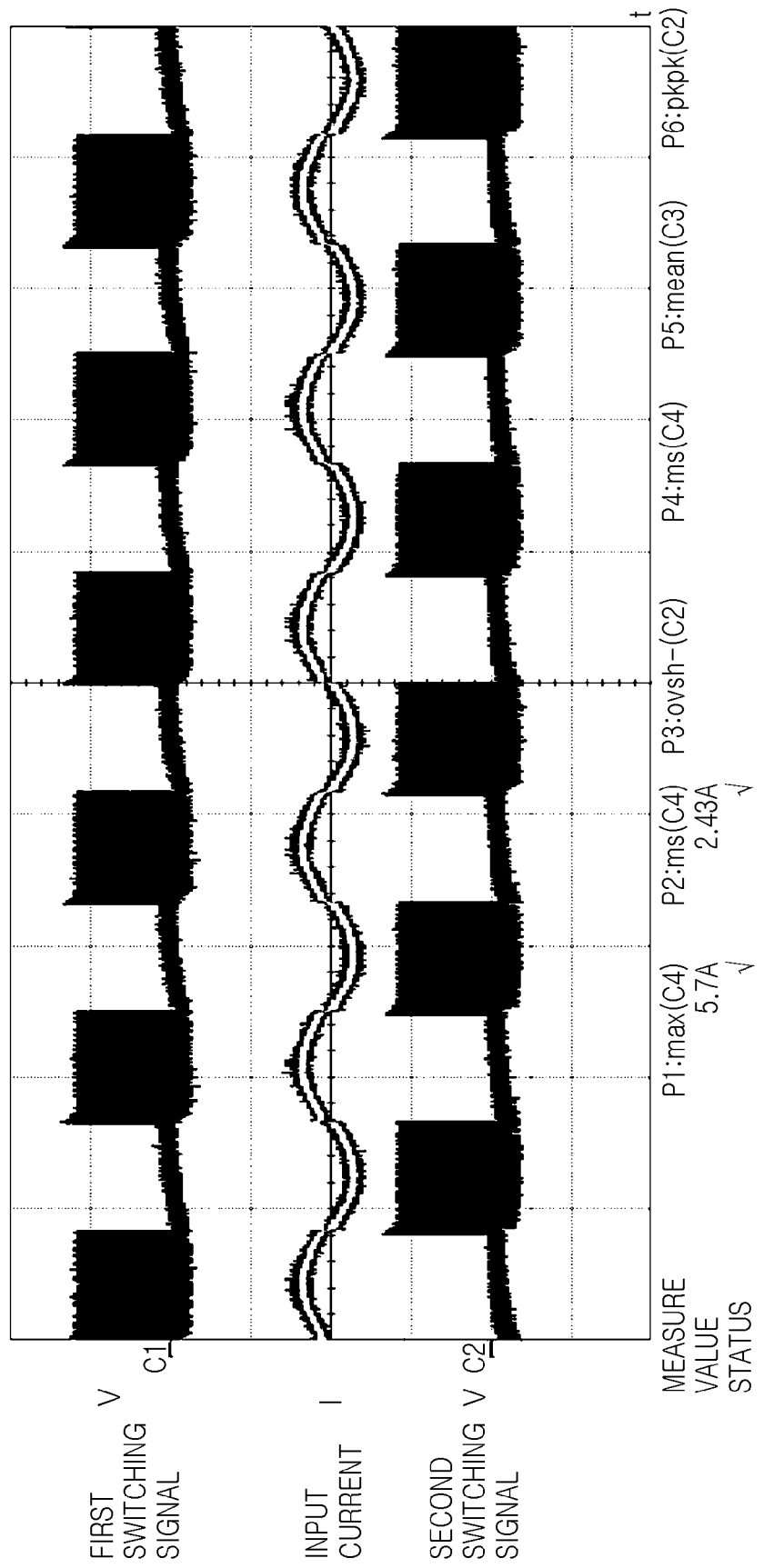
FIG. 7 is a waveform diagram illustrating the bridgeless power factor correction circuit according to the exemplary embodiment of the present invention.

FIG. 7 is a waveform diagram illustrating a bridgeless power factor correction circuit according to an exemplary embodiment of the present invention.

Waveforms, shown in FIG. 7, are generated when an input voltage is 115 Vac, and output power is 280 W. In FIG. 7, the waveforms of the first and second switching signals and the input current that are generated according to the above-described conditions are shown. In the waveforms of the bridgeless power factor correction circuit according to the embodiment of the invention, as shown in FIG. 7, since reverse current does not flow through the inductors, it is possible to obtain sine-wave input current without distortion.

Figure 8A:
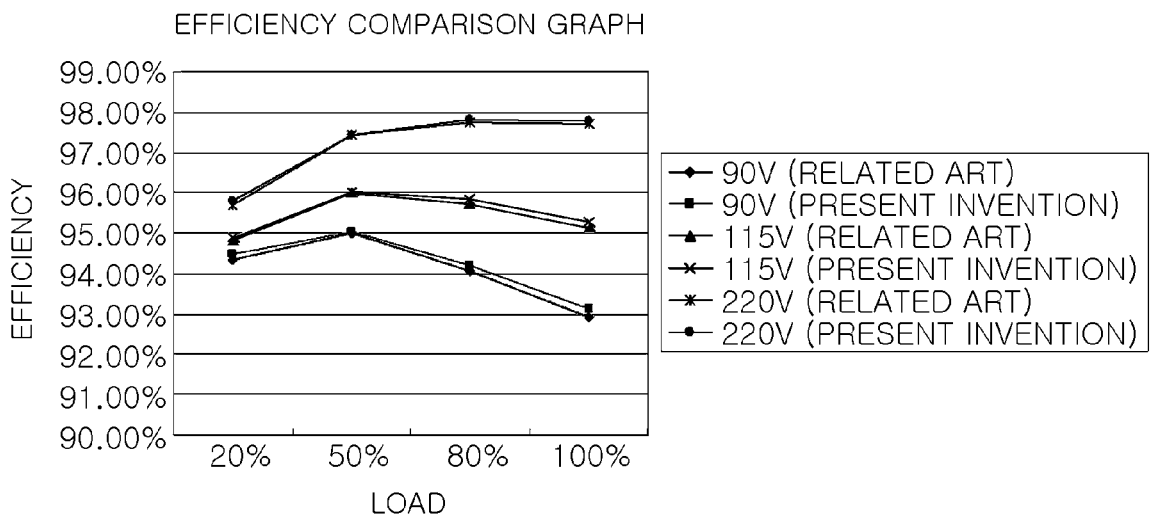
FIG. 8A is a graph illustrating a comparison in efficiency between the related art and the present invention.
Figure 8B:
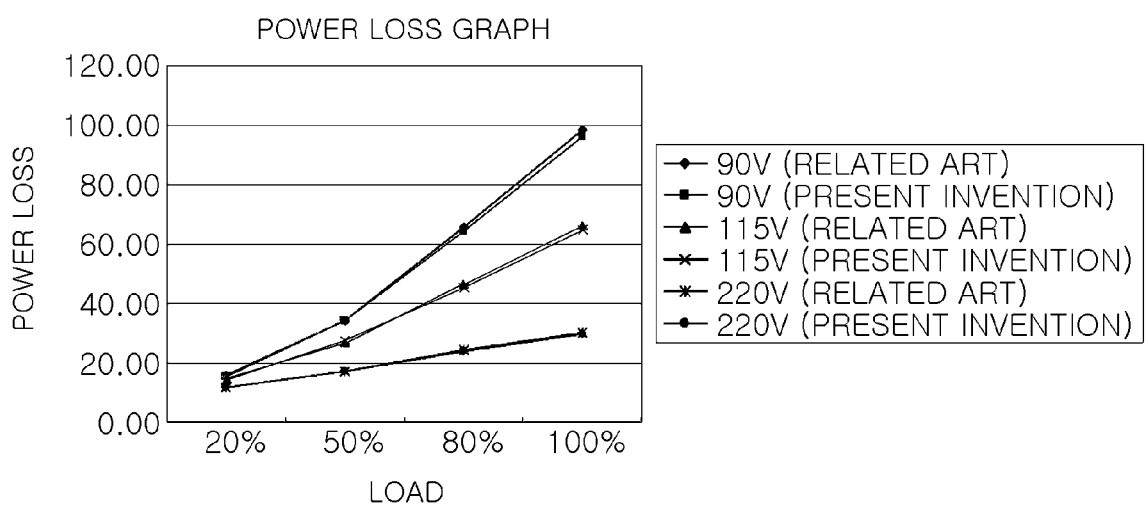
FIG. 8B is a graph illustrating a comparison in power loss between the related art and the present invention.

FIG. 8A is a graph illustrating a comparison in efficiency between the related art and the present invention. FIG. 8B is a graph illustrating a comparison in power loss between the related art and the present invention.

According to the conditions of the graphs shown in FIGS. 8A and 8B, input voltages are 90V, 115V, and 220V, and output power is in the range of 0 to 1300W. The graphs in FIGS. 8A and 8B illustrate the comparison between the bridgeless power factor correction circuit according to the related art and the bridgeless power factor correction circuit according to the embodiment of the invention according to the above-described conditions. As shown in FIGS. 8A and 8B, the bridgeless power factor circuit according to the embodiment of the invention can obtain a higher efficiency that that in the related art by 0.1 to 0.2%. This increase in efficiency is obtained by controlling the switches so that the switches are alternately turned on and off according to the phase of the input AC power to thereby prevent distortion in input current.

As set forth above, according to the exemplary embodiments of the invention, the bridgeless power factor correction circuit can correct a power factor and reduce harmonics by complementarily switching two switches on and off according to phases of input power to prevent distortion in input current.

While the present invention has been shown and described in connection with the exemplary embodiments, it will be apparent to those skilled in the art that modifications and variations can be made without departing from the spirit and scope of the invention as defined by the appended claims.

What is claimed is:

1. A bridgeless power factor correction circuit comprising:
   a switching unit having a plurality of switches and alternately switching input AC power;
   a stabilizing unit rectifying and smoothing the power switched by the switching unit; and
   a control unit controlling an alternate switching operation between the plurality of switches according to phases of the input power.

2. The bridgeless power factor correction circuit of claim 1, wherein the switching unit comprises:
   first and second inductors receiving different phases of the input power; and
   first and second switches connected in series with the first and second inductors, respectively, and alternately turned on and off under the control of the control unit.

3. The bridgeless power factor correction circuit of claim 2, wherein the switching unit further comprises first and second diodes removing common mode noise of the input power.

4. A bridgeless power factor correction circuit comprising:
   a switching unit having a plurality of switches arranged for alternately switching input AC power;
   a stabilizing unit arranged for rectifying and smoothing the power switched by the switching unit; and
   a control unit arranged for controlling an alternate switching operation between the plurality of switches according to phases of the input power, wherein the control unit comprises:
   a detector arranged for detecting phases of the input power;
   a comparator arranged for comparing the phases detected by the detector with a reference phase; and
   a signal generator arranged for multiplying results of the comparison from the comparator by predetermined gate signals and generating first and second switching signals for alternately turning the two switches on and off.

5. The bridgeless power factor correction circuit of claim 4, wherein the detector comprises:
   third and fourth diodes detecting phases of the input power; and
   a plurality of division resistors dividing a voltage of the input power from the third and fourth diodes.

6. The bridgeless power factor correction circuit of claim 4, wherein the comparator comprises:
   first and second comparison units comparing the phases detected by the detector with the reference phase based on the ground; and
   first and second inversion units inverting the comparison results of the first and second comparison units, respectively.

7. The bridgeless power factor correction circuit of claim 6, wherein the signal generator comprises:
   a gate signal generator supplying the predetermined gate signals;
   a first logic device multiplying the gate signal from the gate signal generator by the comparison result from the first inversion unit to generate the first switching signal; and
   a second logic device multiplying the gate signal from the gate signal generator by the comparison result from the second inversion unit to generate the second switching signal.

8. The bridgeless power factor correction circuit of claim 4, wherein the switching unit comprises:
   first and second inductors receiving different phases of the input power; and first and second switches connected in series with the first and second inductors, respectively, and alternately turned on and off under the control of the control unit.

9. The bridgeless power factor correction circuit of claim 8, wherein the switching unit further comprises first and second diodes removing common mode noise of the input power.

10. A bridgeless power factor correction circuit comprising:
   a switching unit having a plurality of switches, each of the switches being configured to selectively couple a terminal of an input AC power source with a power line based on a gate signal, the plurality of switches comprising a first switch connected to a first terminal of the input AC power source and a second switch connected to a second terminal of the input AC power source;
   a stabilizing unit coupled to the switching unit and configured to rectify and smooth switched power output by the switching unit; and
   a control unit coupled to the switching unit and configured to control the plurality of switches, the control unit being configured to disable the first switch during a period the second switch is enabled.

11. The bridgeless power factor correction circuit of claim 10, wherein the switching unit comprises:
   a first inductor coupled between a first terminal of the input AC power source and the first switch; and
   a second inductor coupled between a second terminal of the input AC power source and the second switch.

12. The bridgeless power factor correction circuit of claim 11, wherein the switching unit further comprises first and second diodes configured to remove a common mode noise of the input power.

13. The bridgeless power factor correction circuit of claim 10, wherein the control unit comprises:
   a detector configured to detect the phase of the input power;
   a comparator configured to compare the phase detected by the detector with a reference phase; and
   a signal generator configured to generate a plurality of switching signals for the plurality of switches according to the gate signal and the comparison result from the comparator.

* * * * *